INVENTORS
Cornelis & Ary van der Lely
BY
Mason, Mason & Albright

United States Patent Office 3,060,668
Patented Oct. 30, 1962

3,060,668
RAKING ATTACHMENT FOR SIDE DELIVERY RAKE
Cornelis van der Lely, Zug, Switzerland, and Ary van der Lely, Maasland, Netherlands, assignors to C. van der Lely, N.V., Maasland, Netherlands, a Dutch limited-liability company
Original application Nov. 28, 1955, Ser. No. 549,482, now Patent No. 2,933,878, dated Apr. 26, 1960. Divided and this application Apr. 14, 1960, Ser. No. 22,243
5 Claims. (Cl. 56—377)

The invention relates to a rake with a row of rake wheels for laterally displacing material lying on the ground.

It is an object of the invention to provide an improved implement which can be towed by a tractor.

In accordance with the invention, a raking attachment, for combination with a tractor having a power lift mechanism including a pair of transversely spaced vertically swingable links, comprises a frame having freely rotatable raking members mounted in echelon thereon for side delivery, connecting means provided at transversely spaced points on the frame for pivotally attaching it to the links to allow its free movement in a vertical plane and serving also to prevent its movement in a lateral direction relative to the direction of travel of the tractor. The raking attachment includes ground engaging means for supporting the frame in an operative position above the ground. The connecting means for attachment to the tractor provides for preventing lateral movement of the frame. The frame comprises essentially an elongated frame beam with the connecting means at one end and supporting arms on which said raking members are mounted attached thereto.

This is a division of our application Serial No. 549,482, to issue as Patent No. 2,933,878, on April 26, 1960.

Figure 1:
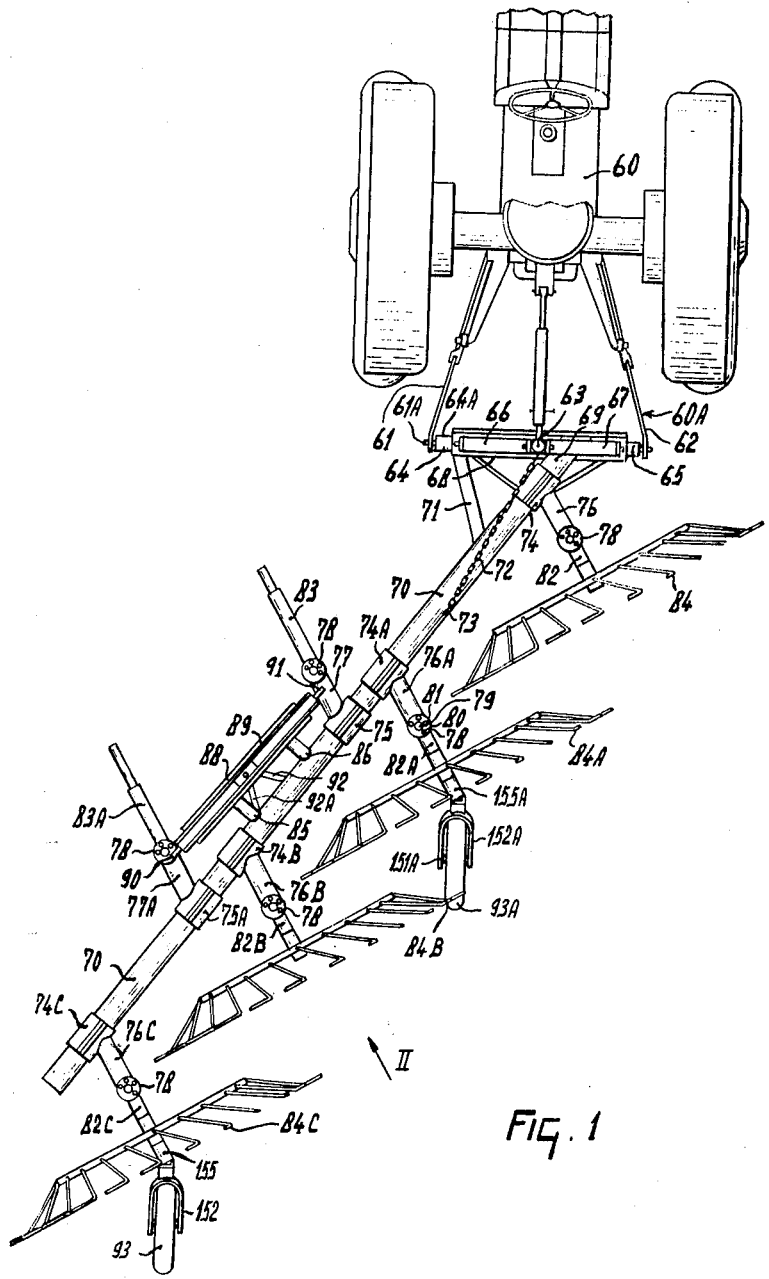
Figure 2:
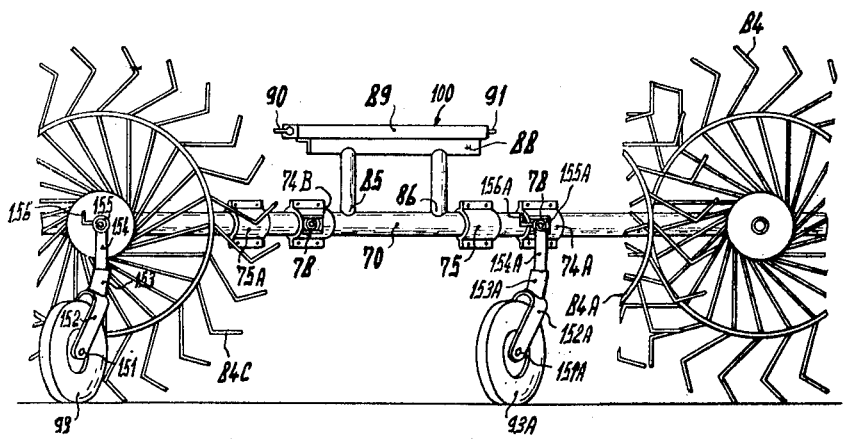

In order that the invention may be clearly understood and readily carried into effect, reference will now be made, by way of example, to the accompanying drawings, wherein:

FIGURE 1 is a plan view of an implement attached to the power lift of a tractor and FIGURE 2 shows a side elevation of a modified detail of the implement in FIGURE 1 viewed in the direction of the arrow II.

Referring to FIGURE 1, a tractor 60 carries a three-point lifting device 60A having three link ends 61, 62 and 63. Link end 63 is located at a higher level than link ends 61 and 62. Disposed between link ends 61 and 62 is an angle-section bar 68 carrying an axle 64A having ends 64 and 65 which bear pins 61A and 62A which comprise the connecting means adapted to pivot in link ends 61 and 62. Two supporting bars 66 and 67 extending obliquely upwards are hinged at their upper extremities to link end 63 and at their lower extremities to angle-section bar 68.

Angle-section bar 68 is connected to one end 69 of a tubular frame beam 70, the connection being reinforced by an interconnecting bar 71 extending substantially in the intended direction of travel of the device. Chain 72 connects link end 63 to a hook 73 on beam 70, and thus limits downward movement of the implement relative to the tractor about the axis of the axle 64A. Two-part sleeves 74, 74A, 74B, 74C, 75 and 75A are clamped on the beam 70. Sleeves 74, 74A, 74B and 74C are spaced an equal distance apart. The distances between the sleeves can, however, be altered as desired by simply releasing and re-clamping the sleeves in different positions. Any ordinary clamping and releasing means appropriate to the purpose may be employed.

Sleeves 74, 74A, 74B, 74C, 75 and 75A carry short arms 76, 76A, 76B, 76C, 77 and 77A which (except for arms 77 and 77A) extend away from the tractor. These arms are parallel, and each has disposed on its end a connection 78 having a pivot 79. Each connection can be secured in any one of a plurality of positions by the introduction of a pin 80 into any one of a number of holes 81.

Axles 82, 82A, 82B, 82C, 83 and 83A are mounted on each connection 78 and angular movement of the axles relative to their respective arms 76, 76A, 76B, 76C, 77 and 77A are prevented by the corresponding pin 80, disposed in one of holes 81. Rake wheels 84, 84A, 84B and 84C are rotatably mounted on axles 82, 82A, 82B and 82C, and supporting devices including ground wheels 93 and 93A are attached to the extremities of axles 82C and 82A. Rake wheels 84, 84A, 84B and 84C are arranged in a single row extending along and behind the frame beam 70, the relative arrangement of the rake wheels being such that in use they co-operate and the implement acts as a side-delivery rake. Each rake wheel will, during the use of the implement, be disposed obliquely to the line of travel and will be rotated by co-action with the ground or the crop lying thereon, or both.

Sleeves 75 and 75A carry two rake wheel supports 83 intended to permit conversion of the side-delivery rake to a swath turner as set forth in more detail in the parent application, Serial No. 549,482. Between sleeves 75 and 75A, beam 70 has secured to it means 100 for the connection thereof to the lifting device 60A of the tractor, to serve the same purpose as the connecting means constituted by the previously described elements 61, 61A, 62, 62A, 64, 64A, 65, 66, 67A and 68. The additional connecting means 100 permits the implement to be brought to another working position as set forth in more detail in the parent application, Serial No. 549,482. Thus a beam 89 which carries pins 90 and 91 at its ends is mounted on bar 88 which is supported by two short struts 85 and 86. Two short arms, 92 and 92A, are mounted on beam 70 near struts 86 and 85. When the rake is turned upside down, pins 90 and 91 can be hingedly connected to ends 62 and 61 and arms 92 and 92A can similarly be connected to end 63 whereby the implement becomes a tedder.

As disclosed in the parent application, instead of the implement running on shoes it may run upon wheels 93 and 93A as shown in the figures herein. Wheels 93 and 93A have horizontal axles 151 and 151A which are connected by means of oblique bars 152 and 152A to bushings 153 and 153A which are rotatable about vertical pins 154 and 154A. Pins 154 and 154A are attached to further bushings 155 and 155A which can rotate about the axles 82A and 82C but which can be secured against such rotation by pins 156 and 156A.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

We claim:

1. In combination with a tractor having a power lift mechanism including a pair of transversely spaced vertically swingable links, a raking attachment comprising a frame having mounted thereon a plurality of freely rotatable raking members having axes disposed obliquely to the direction of travel, connecting means provided on said frame for pivotally attaching the frame to said links to allow free movement of the frame in a vertical plane and serving to prevent movement of said frame in a lateral direction relative to the direction of travel of the tractor, said raking attachment including ground engaging means for supporting the frame in an operative position at a fixed distance above the ground, said frame comprising an elongated frame beam, said connecting means attached to said frame beam at one end thereof, supporting arms on which said raking members are mounted, said supporting arms being mounted on said frame beam.

2. The combination as set forth in claim 1, wherein the raking attachment has at least one ground wheel, said ground wheel being mounted on the frame at its rearmost end.

3. The combination as set forth in claim 2, wherein said ground wheel is placed, as viewed in the intended direction of travel of the combination, behind the raking members.

4. In combination with a tractor having a power lift mechanism including a pair of transversely spaced vertically swingable links, a raking attachment comprising a frame having mounted thereon a plurality of freely rotatable raking members having axes disposed obliquely to the direction of travel, connecting means provided on said frame for pivotally attaching the frame to said links to allow free movement of the frame in a vertical plane and serving to prevent movement of said frame in a lateral direction relative to the direction of movement of the tractor, said raking attachment including ground engaging means for supporting the frame in an operative position at a fixed distance above the ground, said frame comprising an elongated frame beam, said connecting means being attached to said beam by means of a frame member extending substantially in the intended direction of travel of the device.

5. A side delivery raking attachment for connection to a pair of transversely spaced links on a power lift mechanism of a tractor comprising a frame beam, a row of rake wheels mounted in echelon thereon, a bar secured at an angle to said frame beam and at one end thereof, transverse hinge means incorporated at the ends of said bar for connection to said pair of links whereby said bar may be transversely, horizontally and hingedly connected to said pair of links whereby said frame may move about a horizontal axis through said hinge means, and ground engaging means interconnected to said frame beam to provide support therefor.

References Cited in the file of this patent

UNITED STATES PATENTS

| | | |
|---|---|---|
| 536,404 | Teicher | Mar. 26, 1895 |
| 720,098 | Bamford | Feb. 10, 1903 |
| 740,911 | Peto | Oct. 6, 1903 |
| 2,532,652 | Wray | Dec. 5, 1950 |
| 2,621,465 | Klemm | Dec. 16, 1952 |
| 2,712,723 | Ryan | July 12, 1955 |

FOREIGN PATENTS

| | | |
|---|---|---|
| 493,660 | Italy | May 3, 1954 |